United States Patent [19]

Turrentine et al.

[11] Patent Number: 5,366,073

[45] Date of Patent: Nov. 22, 1994

[54] STORAGE CONTAINER FOR MEDIA RECORDS

[75] Inventors: Daniel D. Turrentine, Scottsdale; Michael W. Tibshraeny, Paradise Valley, both of Ariz.

[73] Assignee: JaJa, Inc., Scottsdale, Ariz.

[21] Appl. No.: 100,248

[22] Filed: Aug. 2, 1993

[51] Int. Cl.⁵ .................................... B65D 85/57
[52] U.S. Cl. ................................ 206/309; 206/312; 206/313; 206/444; 206/504; 206/509; 312/9.41
[58] Field of Search ............... 206/309, 310, 312, 313, 206/444, 504, 503, 509, 459.5; 312/9.41, 9.42, 9.48, 9.21, 9.22

[56] References Cited

U.S. PATENT DOCUMENTS

| | | | |
|---|---|---|---|
| 1,038,331 | 9/1912 | Exline | 206/509 |
| 4,044,889 | 8/1977 | Orentreich et al. | 206/459.5 |
| 4,216,857 | 8/1980 | Huang | 206/504 |
| 4,275,943 | 6/1981 | Gelardi | 206/387 |
| 4,493,417 | 1/1985 | Ackeret | 206/444 |
| 4,519,655 | 5/1985 | Kamperman | 312/9.41 |
| 4,702,369 | 10/1987 | Philosophe | 206/310 |
| 4,702,533 | 10/1987 | Seifert | 206/387 |
| 4,705,166 | 11/1987 | Ackeret | 206/309 |
| 4,738,361 | 4/1988 | Ackeret | 206/309 |
| 4,793,479 | 12/1988 | Otsuka et al. | 206/309 |
| 4,804,085 | 2/1989 | Ackeret | 206/309 |
| 4,807,749 | 2/1989 | Ackeret | 206/309 |
| 4,838,422 | 6/1989 | Gregerson | 206/444 |
| 4,863,026 | 9/1989 | Perkowski | 206/312 |
| 5,011,010 | 4/1991 | Francis et al. | 206/309 |

Primary Examiner—Paul T. Sewell
Assistant Examiner—Marie Denise Patterson
Attorney, Agent, or Firm—LaValle D. Ptak

[57] ABSTRACT

A media storage container, particularly suitable for storing CD's and the like, comprises a generally flat, rectangular outer casing having an open front and enclosed top, bottom, sides and rear. The sides of the front casing are provided with mating dovetail edges for interconnecting various ones of the outer casings in a side-by-side relationship. Spaced pin extensions rise from predetermined locations on the top of the outer casing for receipt by correspondingly spaced recesses in the bottoms of the casings; so that the several casings may be stacked one upon the other. The locations of these pins and recesses is such that offset stacking of the outer casings also may be effected. A media record storage tray, having an open top, is slidably mounted through the open front of the outer casing, and is releaseably secured into place by a finger operated release lever. A wire spring is interconnected between the bottom of the tray and the inside of the bottom of the rectangular outer casing, and is located in the space between the tray and the bottom of the outer casing; so that the tray may be fully inserted into the outer casing. The front wall of the tray has an elongated magnifying lens on it for the purpose of enlarging the label of a record medium placed on the tray.

20 Claims, 2 Drawing Sheets

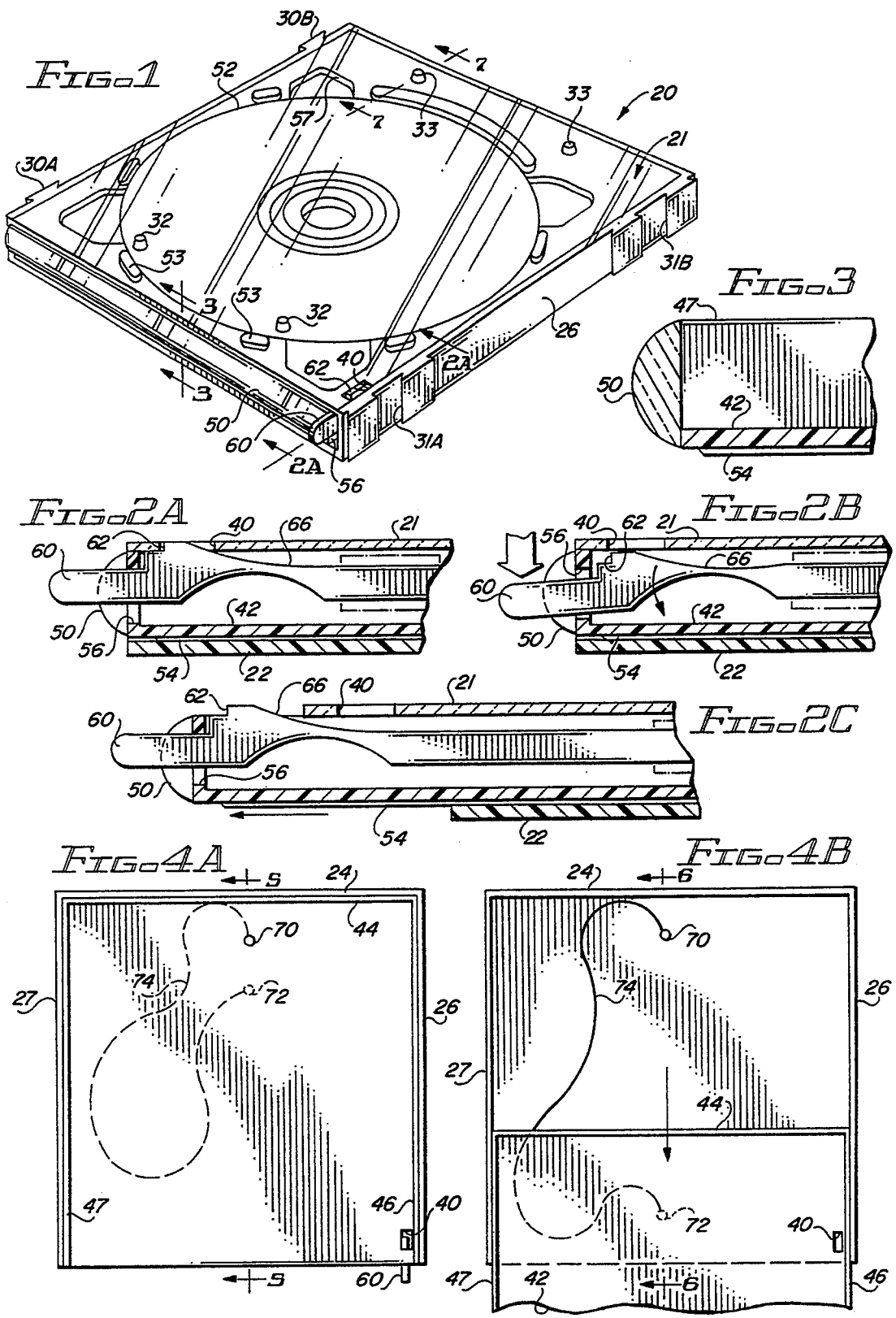

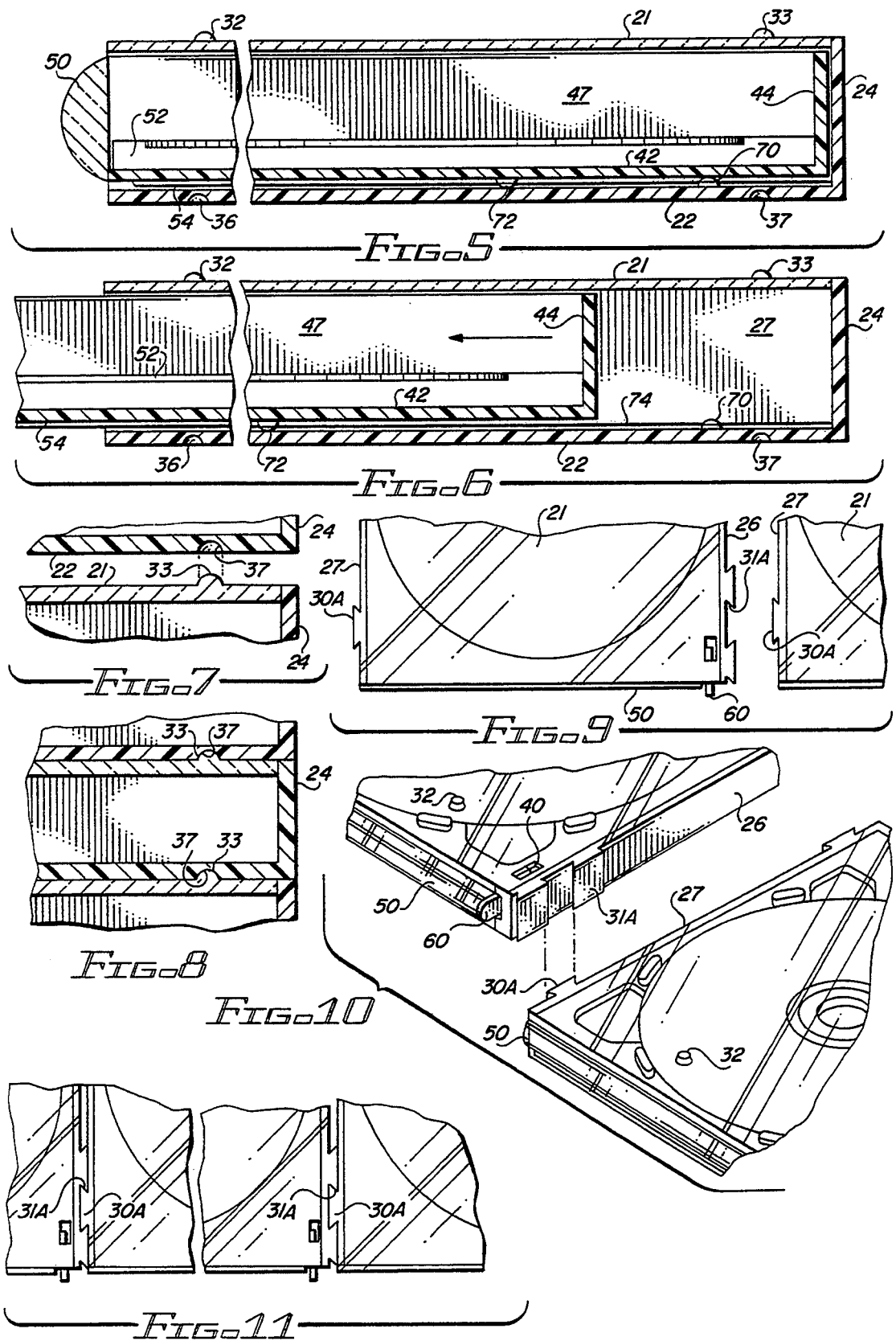

STORAGE CONTAINER FOR MEDIA RECORDS

BACKGROUND

Typically, media records, such as video discs, compact discs (CD's) and cassette recordings, are sold and stored in lightweight clear plastic containers. Usually, these containers are made of two parts, a base member which is used to hold the CD or tape, and a hinged cover, which encloses the container during transport and storage. When removal of the tape or CD from the container is desired, the cover is pivoted to its open position to provide access to the interior of the container. The hinges for the covers of these typical containers are in the form of pin-like projections on one of the two parts, which fit into mating holes or receptacles on the other of the parts. When the containers are closed, it requires two hands to open them. If a person is not familiar with the operation of the covers, frequently an attempt is made to pry apart the two portions of the container, resulting in breaking of the hinge members; so that the packages subsequently do not function properly.

In the case of a standard CD package, the CD itself is pressed onto a central hub, which has resilient fingers compressed by the circular hole in the center of the CD. This hub then grips the CD and holds it in place against falling out of the container when the container is opened. It then is necessary to remove the CD from the hub. This is difficult to do with one hand. CD's are subject to damage from fingers touching the recording surfaces of such CD's, resulting in the attraction of dirt or corrosion onto the CD's surface, causing a degradation of its subsequent performance.

Another problem which readily becomes apparent to persons desiring to store more than a small number of cassette tapes or CD's is that the housing containers for these devices cannot be stacked in secure stacks. In addition, if CD's are stacked one on top of another, removal of a CD from the middle of the stack disturbs all of the remaining CD's above that one in the stack. In addition, if a person is attempting to keep some type of preestablished order for the CD's in the stack, removal of one from the stack requires the person removing that CD to remember the location in the stack for its subsequent return. Over a period of time, the original order generally is lost, and a random arrangement of the CD's takes place. If only a small number of CD packages are present, this is not a significant problem; but whenever greater numbers of CD packages exist, it becomes increasingly difficult to locate the desired CD when the packages, through carelessness or lack of knowledge, are not always returned to their proper order after use.

Another problem which exists, particularly for CD's, is that if the CD packages are stacked one upon the other, or if they are arranged side-by-side on edge on a shelf, the thickness of the package is such that the end label, which appears through the package, is difficult to read. This is caused by the limited vertical space available for the letters of the label of the CD.

In an effort to provide an enlargement of graphical subject matter on a cassette or CD package, a sophisticated optical package, disclosed in the U.S. Pat. to Perkowski No. 4,863,026, was developed. The package disclosed in the Perkowski patent has at least one optically transparent panel on it, with a Fresnel lens structure formed in it. When graphical subject matter of a display within the storage case is viewed through the Fresnel lens, the subject matter is magnified to permit easier reading of the graphical subject matter. In all other respects, the structure of the storage case, disclosed in the Perkowski patent, is substantially the same as the two-piece hinged lid structure which is commonly used for the storage and display of CD's and cassette tapes.

Three patents, which are directed to separate containers for storing flat records such as phonograph records, video discs or CD's, are the U.S. Pat. to Seifert No. 4,702,533; Ackeret No. 4,705,166; and Ackeret No. 4,807,749. The devices disclosed in each of these patents include a housing container designed to hold a pre-established number of records, video discs or CD's. The containers have trays or drawers placed in them for holding the different records or discs to be stored in the containers. Latches and ejection mechanisms are provided in each of these devices for extending a selected drawer or tray outwardly from the storage container; so that withdrawal and replacement of a media record from or onto that tray may be effected. These patents all disclose containers having a finite capacity; and no modular structure is disclosed. Once the containers are full of the number of record media which they are designed to hold, another, separate storage container for additional media records needs to be provided.

Three patents, which disclose modified packages for media. records such as video discs, CD's or cassettes, capable of modular interconnection to form a storage system, are the U.S. Pat. to Gelardi No. 4,275,943; Kamperman No. 4,519,655 and Philosophe No. 4,702,369.

The cassette container disclosed in the Gelardi patent has elongated tongue and groove ribs on the edges, and upper and lower surfaces of the container, to permit several containers to be slidably interconnected on top of one another, as well as in a side-by-side relationship. The containers themselves then have an open front on them, into which a cassette holding drawer is inserted. A coil spring ejector is placed between the rear of the drawer and the rear wall of the outer housing of the container. A selectively releasable locking mechanism is used for retaining the drawers in place; and a selected drawer may be released by finger contact on a depression formed in the front edge of the drawer. When a number of these containers are stacked on top of one another, the depression for finger contact of a drawer, which is below another drawer in the stack, is made somewhat difficult because of the location of the finger contact indentation.

The container disclosed in the Kamperman patent also is directed to a modular dovetail stacking container. This container has a full width door in it, with a pull-down lever interconnected with a slide, which is moved out of the container to present the cassette or CD when removal of the cassette or CD from the storage container is desired. Space is required within the container for this mechanism; and the latch extends across the entire width of the opening from which the cassette or CD is to be inserted or withdrawn.

The Philosphe patent also is directed to a record storage container. This storage container consists of three parts, and comprises, essentially, an outer shell which has a rib and groove arrangement on the top and bottom to permit modular container storage stacking. There is no spring or ejection mechanism in this device; but an inside drawer has grips on each side of it, extending beyond the edges of the sides of the outer shell. To remove a drawer, the grips on the sides are pulled outwardly to provide access to the CD or video disc stored within the container. Because it is necessary to have access to the sides of each of the drawers, no side-by-side placement of stacks of these containers is feasible.

Accordingly, it is desirable to provide a storage container for media records which overcomes the disadvantages of the prior art noted above, which is compact, easy to use, and effective in operation.

SUMMARY OF THE INVENTION

It is a preferred object of this invention to provide an improved storage container.

It is an additional object of this invention to provide an improved media record storage container.

It is another object of this invention to provide an improved media record storage container capable of modular stacking, in which access to the media disc or cassette stored in the container, is through a movable tray.

It is a further object of this invention to provide an improved modular storage container for media records, in which a releasable locking member secures a movable tray inside an outer casing for, access through an open front of the outer casing.

In accordance with a preferred embodiment of the invention, a storage container for media records comprises a rectangular outer casing, having top, bottom, first and second side walls and a rear wall with an open front. A media record storage tray, having a bottom, first and second side walls, a rear wall and a front wall, is reciprocally mounted in the outer casing, with the front wall of the tray closing the open end of the outer casing in a storage position of the tray. The tray is extended through the open front of the outer casing to provide access to a media record placed in the tray. To facilitate movement of the tray between the storage position and the access position, a releasable locking member is provided for locking the tray in its storage position. A spring is located between the bottom of the tray and the bottom of the outer casing for biasing the tray toward its extended or access position.

BRIEF DESCRIPTION OF THE DRAWINGS

FIG. 1 is a top perspective view of a preferred embodiment of the invention;

FIGS. 2A, 2B, and 2C are enlarged partial cross-sectional views of a portion of the embodiment of FIG. 1 taken along the line 2A—2A, illustrating operation of the embodiment of FIG. 1;

FIG. 3 is a cross-sectional view taken along the line 3—3 of FIG. 1;

FIGS. 4A and 4B are top diagrammatic illustrations of a portion of the embodiment shown in FIG. 1, showing different operating conditions;

FIG. 5 is a cross-sectional view taken along the line 5—5 of FIG. 4A;

FIG. 6 is a cross-sectional view taken along the line 6—6 of FIG. 4B;

FIG. 7 is a partial cross-sectional view taken along the line 7—7 of FIG. 1, illustrating a feature of the invention;

FIG. 8 is a further illustration of the feature of FIG. 7;

FIG. 9 is a diagrammatic top view of a portion of the embodiment shown in FIG. 1, illustrating other details of that embodiment;

FIG. 10 is a partial perspective view of the features shown in FIG. 9, illustrating the manner of use; and FIG. 11 is a top diagrammatic view of the features shown in FIGS. 9 and 10, illustrating interconnection of a number of devices of the type shown in FIG. 1.

DETAILED DESCRIPTION

Reference now should be made to the drawing, in which the same reference numbers are used throughout the different figures to designate the same components.

As illustrated in FIG. 1, a storage container 20 is shown which is particularly suited for storing flat media records, such as CD's, video discs or phonograph records. The storage container 20 comprises a hard plastic outer casing, having a clear plastic top 21, a bottom 22 (shown most clearly in FIGS. 2, 3, 5 and 6), a pair of opposing side walls 26 and 27, and a rear wall 24 (shown most clearly in FIGS. 5 and 6).

The side walls 26 and 27 each having a pair of mating male and female dovetail interlocking projections 30A/30B and 31A/31B, as shown most clearly in FIGS. 1 and 9 through 11. In addition, the outer casings of the storage containers each have two pairs of projecting pins 32 and 33 on the top surface, as illustrated in FIGS. 1, 5 and 6. The bottom 22 of the outer casing has corresponding front and rear pairs of mating recesses 36 and 37 to facilitate stacking of any desired number of the storage containers 20 on top of one another. The manner in which this is done is illustrated in FIGS. 7 and 8, which show the placement of the bottom 22 of one storage container on top of the top 21 of another; so that the pin 33 extends into the corresponding recess or hole 37, as shown in FIGS. 7 and 8. The pins 32 and 33 each are located twenty-five percent of the distance of the total width of the top 21 of the outer casing, as are the corresponding locations for the pairs of recesses 36 and 37. This permits offset stacking of different ones of the storage containers 20, as well as direct vertical stacking of one container upon the other. By doing this, different arrangements of stacked containers may be effected.

As illustrated in FIGS. 9, 10 and 11, the mating dovetail projections and recesses 30A/30B and 31A/31B permit side-by-side interlocking of any desired number of the containers 20, as shown. To accomplish this, one container is placed adjacent the other and moved vertically downwardly; so that the dovetail connectors 30A fit in the dovetail grooves 31A and the connectors 30B fit into the dovetail grooves 31B, in the manner illustrated in FIG. 11. By interlocking the storage containers 20 side-by-side, as illustrated in FIGS. 9 through 11, and then by stacking them either directly on top of one another or in the offset fashion mentioned above, a secure modular arrangements of any desired number of storage containers 20 may be used.

Each of the storage containers 20 includes an open-topped inner tray having a bottom 42, a rear or back 44, and first and second sides 46 and 47. The front of each tray is provided with an elongated semi-cylindrical lens 50, extending across the entire width of the front, and having a vertical height selected to close the opening of the front of the outer casing of the storage container.

The bottom 42 of the tray is spaced above the inside of the bottom 22 of the outer casing by means of a pair of elongated ribs or guides 54 located adjacent each edge of the tray under the sides 46 and 47. These ribs 54 cause the space between the bottom 42 of the tray and the bottom 22 of the outer casing to be approximately 1/32 inch high. In this space, an elongated steel wire spring 74 (most clearly shown in FIGS. 4A, 4B and 6) is connected between. an anchor pin 70, attached near the rear of the outer casing on the center of the bottom 22, and a corresponding anchor pin 72 extending downwardly from the outside of the bottom 42 of the tray. The configuration of the spring is an elongated flat serpentine; and the spring itself, in its relaxed configuration, seeks to achieve a substantially straight configuration. It is bent into the configuration illustrated in FIGS. 4A and 4B to exert an outward pressure, in the direction of the arrows shown in FIG. 4B and in FIG. 6, to push the bottom 42 of the media storage tray out of the front opening in the outer casing.

A releasable locking mechanism or latch 60 is provided on the right hand side of the tray (as viewed in FIG. 1) just inside the side wall 46. The latch comprises an elongated plastic lever 60 having a memory position, as illustrated in FIGS. 2A and 2C, to normally bias it upward; so that a shoulder 62 on an extension at the top of the latch enters into a slot 40, located in the top 21 of the outer casing. The right-hand end of the latch 60, as illustrated in FIGS. 2A through 2C, is secured to the side wall 46 of the tray by any suitable fashion, such as by means of a suitable adhesive, heat welding, or the like.

When the tray is fully inserted into the outer casing, as illustrated in FIGS. 1 and 4A, the cam surface 66 on the lever 60 is engaged by the top 21 to permit the insertion. When the tray is in place, the flex area of the spring forming the locking lever 60, forces the tab 62 up into the slot 40 to hold the tray against outward movement. When the tray is to be slid out of the outer casing, the exposed end of the lever 60 is depressed downwardly, as illustrated in FIG. 2B. This causes the shoulder 62 to clear the edge of the slot 40 in the top 21 of the storage container. The spring 74 then attempts to straighten out and pushes the tray outwardly in the direction of the arrows shown in FIG. 4B and 6. This occurs after the release of the lever 60, which permits the lever 60 once again to resume the position shown in FIG. 2A. At this time, however, the shoulder 62 has cleared the top 21 of the outer casing to permit movement of the tray outwardly from the outer casing on the ribs 54 under the pressure of the spring 74 as it uncoils or elongates.

The strength of the spring 74 is selected to move the tray most of the distance out of the outer casing, but not all of the way. Typically, the spring 74 moves the tray approximately two-thirds of the total amount of the distance with which it may be withdrawn from the outer casing. Once the tray is extended as illustrated in FIGS. 2C, 4B and 6, it may be pulled the rest of the way by hand until a catch or stop (not shown), located on the rear wall 44 or the bottom 42 of the tray, engages a similar stop or projection (not shown) on the outer casing. Such a stop typically is provided so that the tray remains in place in the outer casing, even if it is in its withdrawn position for access to a record stored in it. A variety of drawer-like stops or catches may be provided for this purpose.

The storage of a video disc, CD disc or the like in the tray is effected by means of a plastic insert 52, which has a platform or recess in its center for receiving a correspondingly sized circular recording disc. Around the periphery of the stored recording disc are projections or shoulders 53 to center the disc; and reliefs or cutouts 57 also are provided at the four corners of such a disc, as illustrated in FIGS. 1 and 10. These relief areas or cutouts permit a person to reach through the open top of the tray when it is in the fully extended position to grasp the recording disc by the hole in its center and an edge to remove the disc, or to place the disc back on the insert 52 in the tray. The particular arrangement of cutouts, shoulders, recesses and the like in this insert 52 may be varied to suit particular design considerations. It is important to note, however, that the insert 52 provides a raised platform to permit placement of the media record above the bottom 42 of the tray; so that it is possible to reach through the cutouts 57 in the four corners of the insert 52 to easily grasp the recording disc by its edges.

The insert 52 is a removable insert, and is not physically connected to the tray in any way. As a consequence, when the storage container 20 of FIG. 1 originally is sold, with a particular recording in it, a label in the form of a paper sheet typically is placed on the bottom of the tray 42, with a vertically bent up edge or label edge located adjacent the elongated lens 50 on the front of the tray. When the insert 52 then is placed over the paper sheet, it also abuts this label edge to press it against the inside of the lens 50. Thus, the indicia on the label easily may be read in a magnified condition through the lens 50. The result is that when a number of storage containers 20 are stacked one on top of the other, the labels for the recording in each of the trays in each of the storage containers 20, readily may be read through the lens 50 for identification purposes.

It should be noted that irrespective of the number of storage containers, which may be stacked together in any type of modular system configuration, the removal of any recording in the system configuration independently may be effected by means of the release of the locking lever 60 associated with the particular tray for that recording to extend that tray from the container 20 in the modular stack of containers 20. None of the other storage containers are disturbed. When they are interconnected as shown in FIGS. 8 and 11, a large number of containers may be compactly stacked side-by-side, and on top of one another, to provide a compact storage "shelf" of containers. The outer casing of the storage container 20 always remains in place. Since the trays within each of the outer casings remain located in the outer casings, even in the extended "access" position, the original placement or order of the different recordings or media records which are located in each of the trays, is undisturbed as these media records are withdrawn, used and returned back to their trays, which then are closed until that recording once again is desired. The location of each recording is always the same relative to other recordings, unless a new position is intentionally made by disassembling the modular assembly and moving the particular storage container to another position in the modular stack of containers.

It should be noted that opening of the storage containers is a simple, one finger operation. All that is necessary is to momentarily downwardly depress the lever 60, as shown in FIG. 2B. The spring 74 then uncoils and pushes the bottom 42 of the tray outwardly through the force exerted between the mounting pins 70 on the bottom 22 of the outer casing, and 72, on the bottom of the tray 42, as illustrated in FIG. 4B. By placing the record disc in a recess in the insert 52 or against raised circularly arranged support projections, as illustrated in FIG. 1, the disc is easily removed from the insert 52 on the tray, as described previously. It should be noted that there is no longer any requirement for a friction engagement projection through the center hole of the disc; so that touching of the recording area of the disc is much less likely, since it readily may be grasped by the hole in its center and one edge, through the relief areas in the insert on the tray, as described.

Since no hinged opening is used to obtain access to a recording, the problem which has existed with prior art devices, in the frequent breaking of hinges in opening up the cases, is clearly obviated. Also, it should be noted that the storage container 20 also may comprise the original packing and shipping container; so that additional storage containers or shelves do not need to be provided by the consumer of media records which are originally purchased in containers 20 of the type described above.

The foregoing description of the preferred embodiment of the invention should be considered as illustrative, and not as limiting. Various changes and modifications will occur to those skilled in the art, without departing from the true scope of the invention as defined in the appended claims.

We claim:

1. A storage container for media records including in combination:
   a rectangular outer casing having top, bottom, first and second side walls, a rear wall, and an open front;
   a media record storage tray having a bottom, first and second side walls, a rear wall and a front wall movably mounted in said outer casing with said front wall of said tray closing the open front of said outer casing in a storage position of said tray and said tray being extendable through the open front of said outer casing to an access position thereof to permit access to a media record stored therein;
   a releasable locking member for releasably locking said tray in said outer casing in said storage position and operated to release said tray for movement to said access position;
   guide ribs on one of the outside of the bottom of said tray and the inside of the bottom of said outer casing for providing a predetermined space of approximately 1/32 inches high between the bottom of said outer casing and the bottom of said tray; and
   an elongated, flat, serpentine, non-coil wire spring having first and second ends located in said predetermined space between the bottom of said tray and the bottom of said outer casing in the storage position of said tray for biasing said tray to the access position thereof, with the first end of said spring attached to the inside of the bottom of said outer casing and the second end of said spring attached to the outside of the bottom of said tray, said elongated spring having a thickness which is less than said predetermined space between the bottom of said tray and the bottom of said rectangular outer casing.

2. The combination according to claim 1 wherein said front wall of said tray comprises an elongated magnifying lens.

3. The combination according to claim 2 further including a media record storage insert carried by said tray for spacing a media record placed thereon from the bottom of said tray and further having relief areas therein for facilitating the handling of a media record placed on said insert in said tray.

4. The combination according to claim 3 wherein said first and second side walls have a predetermined height, and said insert comprises an essentially flat rectangular member, the thickness of which is less than said predetermined height of said first and second side walls of said tray, and having a front edge and a rear edge, with the front edge thereof located to abut a label placed between said front edge of said insert and the inside of said front wall of said tray to facilitate holding said label in place to be read through said magnifying lens comprising the front wall of said tray.

5. The combination according to claim 4 further including guide means on said insert member for retaining a media record thereon in a predetermined position.

6. The combination according to claim 1 wherein said releasable locking member comprises a spring latch carried on said tray for engagement with a portion of said outer casing when said tray is in said storage position.

7. The combination according to claim 6 wherein said tray has an open top for facilitating the placement into and removal from said tray of a media record.

8. The combination according to claim 1 wherein said spring is placed under compressive tension with said storage tray in said storage position thereof and selected to extend said storage tray from said storage position a predetermined distance toward said access position, such that further withdrawal of said storage tray to said access position may be accomplished manually.

9. The combination according to claim 8 wherein said first and second side walls have a predetermined height, and said insert comprises an essentially flat rectangular member the thickness of which is less than said predetermined height of said first and second side walls of said tray, and having a front edge and a rear edge, with the front edge thereof located to abut a label placed between said front edge of said insert and the inside of said front wall of said tray to facilitate holding said label in place.

10. The combination according to claim 9 further including guide means on said insert member for retaining a media record thereon in a predetermined position.

11. The combination according to claim 10 wherein the top and bottom of said rectangular outer casing includes mating stacking members for facilitating direct and offset stacking of pluralities of said storage containers one upon the other.

12. The combination according to claim 11 wherein said mating stacking members comprise at least two projecting pins on the outside of the top of said outer casing for alignment with corresponding recesses in the outside of the bottom of said outer casing.

13. The combination according to claim 12 further comprising mating connector members on the outside of the first and second side walls, respectively, of said rectangular outer casing to permit interconnection of a plurality of said outer casings in a side-by-side relationship.

14. The combination according to claim 1 wherein the top and bottom of said rectangular outer casing includes mating stacking members for facilitating direct and offset stacking of pluralities of said storage containers one upon the other.

15. The combination according to claim 14 wherein said mating stacking members comprise at least two projecting pins on the outside of the top of said outer casing for alignment with corresponding recesses in the outside of the bottom of said outer casing.

16. The combination according to claim 15 further comprising mating connector members on the outside of the first and second side walls, respectively, of said rectangular outer casing to permit interconnection of a plurality of said outer casings in a side-by-side relationship.

17. The combination according to claim 1 wherein said tray has an open top for facilitating the placement into and removal from said tray of a media record.

18. The combination according to claim 17 further including a media record storage insert carried by said tray for spacing a media record placed thereon from the bottom of said tray and further having relief areas therein for facilitating the handling of a media record placed on said insert in said tray.

19. The combination according to claim 18 further including guide means on said insert member for retaining a media record thereon in a predetermined position.

20. The combination according to claim 19 wherein said first and second side walls have a predetermined height, and said insert comprises an essentially flat rectangular member the thickness of which is less than said predetermined height of said first and second side walls of said tray, and having a front edge and a rear edge, with the front edge thereof located to abut a label placed between said front edge of said insert and the inside of said front wall of said tray to facilitate holding said label in place.

* * * * *